US006728268B1

(12) United States Patent
Bird

(10) Patent No.: US 6,728,268 B1
(45) Date of Patent: Apr. 27, 2004

(54) METHOD AND SYSTEM TO CONNECT INTERNET PROTOCOL HOSTS VIA AN APPLICATION SPECIFIC BUS

(75) Inventor: David G. Bird, Greensboro, NC (US)

(73) Assignee: Trimble Navigation Ltd., Sunnyvale, CA (US)

( * ) Notice: Subject to any disclaimer, the term of this patent is extended or adjusted under 35 U.S.C. 154(b) by 0 days.

(21) Appl. No.: 09/338,316

(22) Filed: Jun. 22, 1999

(51) Int. Cl.$^7$ ................................................. H04J 3/24
(52) U.S. Cl. ........................ 370/474; 370/312; 370/338; 370/349; 370/392; 370/401; 370/230; 709/230; 701/58; 701/32; 710/4; 710/11
(58) Field of Search ................................. 370/465, 466, 370/469, 400, 401, 349, 402, 338, 389, 312, 392, 393, 395.1, 395.5, 395.51, 230; 710/4, 11, 62; 701/1, 24, 58, 33, 32, 36, 35; 340/438, 439–441; 709/228, 249, 250, 230

(56) References Cited

U.S. PATENT DOCUMENTS

| | | | | |
|---|---|---|---|---|
| 4,258,421 A | * | 3/1981 | Juhasz et al. | 701/35 |
| 5,303,348 A | * | 4/1994 | Botzenhardt et al. | 710/114 |
| 5,548,649 A | * | 8/1996 | Jacobson | 380/49 |
| 5,640,511 A | * | 6/1997 | Botzenhardt et al. | 714/57 |
| 5,732,074 A | * | 3/1998 | Spaur et al. | 370/313 |
| 6,128,294 A | * | 10/2000 | Oura et al. | 370/389 |
| 6,233,626 B1 | * | 5/2001 | Swales et al. | 710/11 |
| 6,253,122 B1 | * | 6/2001 | Razavi et al. | 701/1 |
| 6,330,605 B1 | * | 12/2001 | Christensen et al. | 709/226 |
| 6,362,730 B2 | * | 3/2002 | Razavi et al. | 340/438 |
| 6,363,071 B1 | * | 3/2002 | Fink et al. | 370/389 |
| 6,370,449 B1 | * | 4/2002 | Razavi et al. | 701/1 |
| 6,535,918 B1 | * | 3/2003 | Bender et al. | 709/228 |

* cited by examiner

*Primary Examiner*—Dang Ton
*Assistant Examiner*—Tri H. Phan
(74) *Attorney, Agent, or Firm*—Blakely Sokoloff Taylor & Zafman LLP

(57) ABSTRACT

The present invention includes a system and method to implement Internet Protocol (IP) hosts on an application specific bus without disrupting the application specific bus. In one embodiment, an IP host determines the application specific bus address of a remote device, the remote device having an IP address in addition to the application specific bus address. The IP host formats a message conforming to the application specific bus, the message containing IP data and message identifiers. The IP host transmits the message on the application specific bus. In addition, the IP host negotiates for network access on the application specific bus. A destination IP host receives the message based upon the application specific bus address of the destination IP host and authenticates the message as an IP messages based upon the message identifiers. In addition, the destination IP host extracts the IP data from the message and processes the IP data by a conventional IP network processing protocol.

19 Claims, 8 Drawing Sheets

| 310 | 312 | 314 | 316 | 318 | 320 | 322 | 324 | 326 | 328 | 330 | 332 |
|---|---|---|---|---|---|---|---|---|---|---|---|
| ETHERNET DEST ADDR | ETHERNET SRC ADDR | FRAME TYPE | H/W TYPE | PROT TYPE | HAND SIZE | PROT SIZE | OP | SENDER ETHERNET ADDR | SENDER IP ADDR | TARGET ETHERNET ADDR | TARGET IP ADDR |
| 6 BYTES | 6 BYTES | 2 BYTES | 2 BYTES | 2 BYTES | 1 BYTE | 1 BYTE | 2 BYTES | 6 BYTES | 4 BYTES | 6 BYTES | 4 BYTES |
|  |  | 0X0806 | 0X0001 | 0X0800 | 0X06 | 0X04 | 0X0001 FOR REQUEST 0X0002 FOR REPLY |  |  |  |  |

METHOD AND SYSTEM TO CONNECT INTERNET PROTOCOL HOSTS VIA AN APPLICATION SPECIFIC BUS

FIELD OF THE INVENTION

The present invention relates to bi-directional communication over a network and, in particular, relates to a protocol to connect Internet Protocol (IP) hosts via a control bus.

BACKGROUND OF THE INVENTION

As today's vehicles have become more sophisticated and dependent upon a variety of electronic and electrical components, it has become necessary to devise methods of networking the various components together. Communication is needed between the many circuits and functions of the vehicle, for example, to shift a transmission in response to engine load.

In order to standardize communications between the various components of the vehicles, the Controller Area Network (CAN) was defined as a serial communications bus. CAN uses a shared broadcast bus that runs at speeds up to one megabit per second. The CAN protocol sends message frames of variable lengths, containing from zero to eight data bytes, among various devices within the vehicle wherein each frame has a unique identifier.

The Society of Automotive Engineers (SAE) has developed a standard CAN protocol, SAEJ1939, for the bus and truck industry, based upon CAN Specification 2.0 Part B by Robert Bosch, GmbH. The SAE specification gives plug-and-play capabilities for vehicle manufacturers. The specification assigns 29 bit frame identifiers for different purposes, such as engine diagnostics and vehicle position, and specifies a data rate of 250 kilobits per second. Standard SAEJ1939 protocols allow modules from many suppliers to be easily linked together forming a type of open architecture. An open architecture allows standardized diagnostic testing and allows suppliers to benefit from the economies of scale of mass-produced standard protocol devices.

SAEJ1939 uses the CAN protocol which permits any device to transmit a message frame on the network when the bus is idle. Each frame identifier includes, in order, a field for message priority, a field for the type of data that the message contains, and a field for the sending node's address. The entire 29-bit identifier uniquely establishes the overall priority of each frame. The protocol avoids collisions on the CAN by an arbitration process that occurs during identifier transmission (using a non-destructive arbitration scheme). This arbitration permits higher priority messages to get through with lower latency (less delay).

Subpart SAEJ1939/21 specifies the link layer protocol for SAEJ1939. Other parts of SAE J1939 define the actual application content of messages. As such, SAEJ1939 defines a simple two-layer networking architecture, a link layer and an application layer. The link layer (SAEJ1939/21) allows for proprietary messages of arbitrary content to be communicated. Standard SAEJ1939 devices ignore such messages.

A computer network is a system for communications among computers that allows them to share information. The content, scope, size, speed, and reliability of a network varies depending on the protocols and implementation used. Protocols are preestablished methods of communication between computers. The term TCP/IP (Transmission Control Protocol/Internet Protocol), refers to a family of protocols of which TCP and IP are just two. TCP/IP is broken down into a protocol of a number of layers. Each layer corresponds to a different facet of communication within the network. Devices that communicate using TCP/IP are referred to as IP hosts.

The link layer is responsible for communicating with actual network hardware. The link layer transfers data, which the link layer receives from the network bus, to the network layer. The link layer put s data, which the link layer receives from the network layer, on the bus. Within the SAEJ1939 architecture, the SAEJ1939/21 protocol defines the link layer.

The network layer determines how to get data to its destination, either out onto the bus or into application programs. The network layer makes no decision whether or not the data will reach its destination but only decides where to put the data for transmission. The third layer, the transport layer, provides data flow for the application layer. The transport layer guarantees the reliability of the communication. The fourth or application layer is where the user or IP client or server program interacts with the network. This is where any application programs reside.

The IP (of TCP/IP) resides on the network layer and is used for almost all communication between IP hosts. The basic communications message unit in IP is the IP datagram. When sending datagrams, the IP determines how to get the datagrams to their destinations and when receiving datagrams, determines how and where they belong. IP does not concern itself with whether the datagrams arrive reliably at their given destination or with the order in which they arrive. If a datagram arrives with any problems, IP discards it. It is the responsibility of the transport layer and application layer to determine, to correct, or to otherwise deal with the unreliability of datagrams. The IP is responsible for recognizing source and destination addresses while ensuring receipt at the proper location as well as checking for the accuracy of datagrams received from the network.

IP is the most widely used network layer protocol in the world. It is available on almost all of the world's desktop computers, and it is becoming widely used in embedded computers. Software for many ubiquitous transport and application layer protocols that run on top of IP is widely available for virtually all computer operating systems.

What is required is a protocol for incorporating IP hosts onto an application specific control bus such as a SAEJ1939. Further, what is required is a method and apparatus to transmit IP datagrams without interfering with the interaction of standard CAN devices, and, specifically, without interfering with the interaction of standard SAE J1939 devices.

SUMMARY OF THE INVENTION

The present invention includes a system and method to implement Internet Protocol (IP) hosts on an application specific bus without disrupting the application specific bus. In one embodiment, the application specific bus address of a remote device is determined, the remote device having an IP address in addition to the application specific bus address. An IP host formats a message conforming to the application specific bus, the message containing an IP datagram and message identifiers. The IP host transmits the message on the application specific bus. A destination IP host receives the message based upon the application specific bus address of the destination IP host and authenticates the message as an IP message based upon the message identifiers. In addition, the destination IP host extracts the IP datagram from the message and processes the IP data by a conventional IP network processing protocol.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments but are for explanation and understanding only.

FIG. 3 is a block diagram of an Ethernet Address Resolution Protocol (ARP) message;

DETAILED DESCRIPTION

Figure 1:
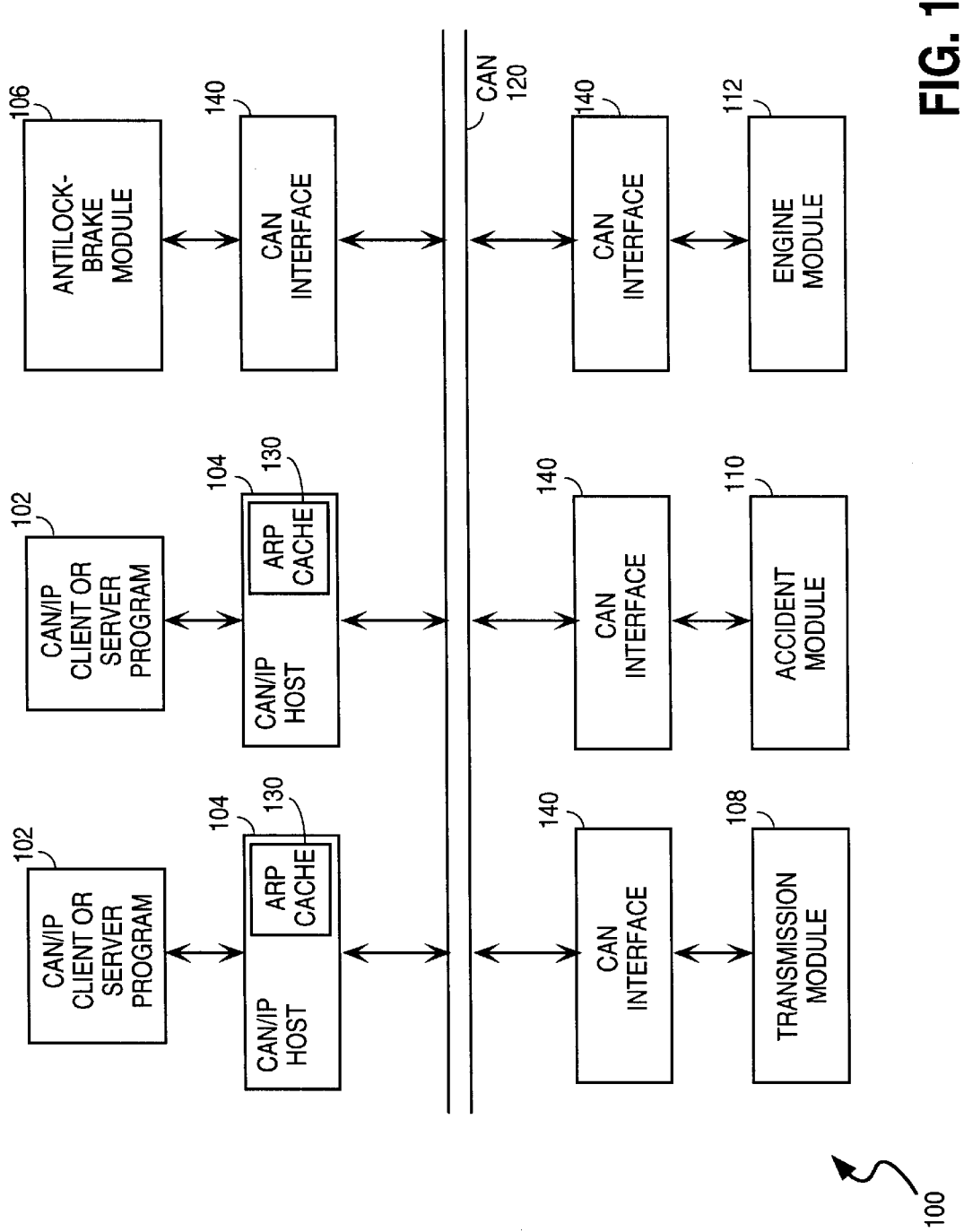
FIG. 1 is a block diagram illustrating one embodiment of a system of connecting at least one Internet Protocol (IP) host to a Controller Area Network (CAN)

The present invention describes a method and system to connect Internet Protocol (IP) hosts to an application specific control bus such as the Controller Area Network (CAN).

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. The algorithms and displays presented herein are not inherently related to any particular computer or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

FIG. 1 is a block diagram of the overall system of connecting multiple CAN/Internet Protocol (CAN/IP) hosts 104 to a Controller Area Network (CAN) 100. In the FIG. 1 illustration, CAN/IP hosts 104 are connected via CAN bus 120 to CAN 100. CAN/IP host 104 interacts with CAN/IP client or server program 102 through a software interface. In one embodiment, this is a standard IP socket interface. Also, CAN/IP host 104 contains Address Resolution Protocol (ARP) cache 130 for storing resolved addresses of CAN/IP hosts 104 accessible on CAN 100. CAN 100 also includes a series of vehicle control modules 106, 108, 110, and 112 (CAN devices), all connected via standard CAN interface 140 to CAN bus 120. In an alternate embodiment, CAN/IP host 104 and CAN/IP client or server program 102 may be contained within the same device.

Figure 2:
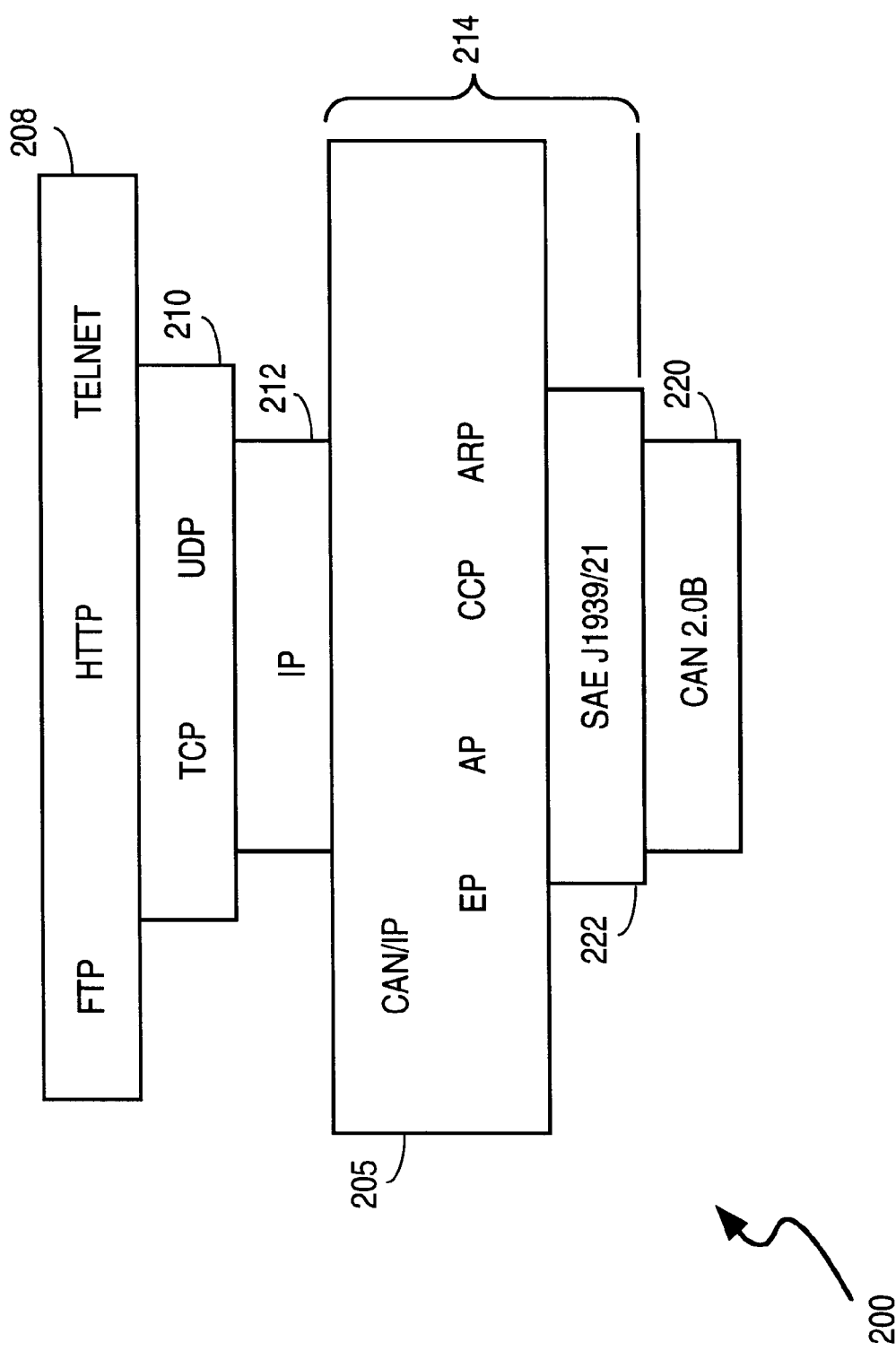
FIG. 2 is a block diagram illustrating an embodiment of CAN/IP host protocol layers.

FIG. 2 is a block diagram illustrating IP host protocol layers 200. IP host protocol layers consist of application layer 208, transport layer 210, network layer 212, link layer 214, and physical layer 220.

Application layer 208 may consist of standard IP host applications such as File Transport Protocol (FTP), Hypertext Transfer Protocol (HTTP), and Telnet. These and other application protocols make use of the services of standard transport protocols such as Transmission Control Protocol (TCP) and User Datagram Protocol (UDP) contained within transport layer 210. Both TCP and UDP make use of the standard services of Internet Protocol (IP) at the network layer 212. In one embodiment, the physical layer 220 protocol may be CAN 2.0B.

Between network layer 212 and physical layer 220 is link layer 214. Link layer 214 has two sub-layers specified by CAN/IP 205 and SAE J1939/21 (222). SAE J1939/21 (222) specifies a protocol for communicating frames containing from zero to eight data bytes on the CAN bus as well as a protocol for communicating larger messages using what is termed the Transport Protocol. Transport Protocol is a standard communications protocol of SAE J1939/21 (222) which breaks large messages into seven byte pieces and sends them individually with a sequence number.

In one embodiment, CAN/IP 205 may have four component protocols: Encapsulation Protocol (EP), Authentication Protocol (AP), Address Resolution Protocol (ARP), and Congestion Control Protocol (CCP).

The EP manages the packing and unpacking of IP datagrams into SAE J1939/21 (222) message frames using the SAE J1939/21 (222) Transport Protocol. In one embodiment, the EP messages containing CAN/IP datagrams use the SAE J1939/21 (222) Proprietary A Parameter Group Number (PGN)=61184. This is the SAE J1939/21 (222) destination-specific Protocol Data Unit (PDU). In one embodiment, each IP datagram may have two bytes added to aid in message authentication and to indicate message type. In this embodiment, an IP datagram has an added first byte set at 16, to indicate a CAN/IP message, and an added second byte set at 0, to indicate a standard IP datagram. In one embodiment, the added second byte may be set at 2, to indicate a compressed IP datagram. Each IP datagram, with header, is transmitted as a single Transport Protocol message. In one embodiment, CAN/IP 205 supports IP datagrams with lengths from 28 to 576 bytes. With the two-byte header, the IP datagrams in this embodiment will be transmitted using from 5 to 83 eight-byte CAN frames.

In one embodiment, the AP of CAN/IP host 104 verifies that SAE J1939/21 (222) Proprietary A Parameter Group Number (PGN)=61184 messages that it receives are in fact CAN/IP 205 messages. In this embodiment, CAN/IP messages are those messages that have a value of 16 in the first information byte.

When CAN/IP 205 receives a potential CAN/IP message (PGN=61184; first data byte=16), the local Address Resolution Protocol (ARP) cache 130 is queried to determine if the corresponding source address is already in the ARP cache 130. If it is not, CAN/IP 205 requests the Software Identification Report (SIR) (PGN=65242) of the source device (i.e., the originator of the message) using the previously received source address. CAN/IP 205 requests the SIR before it accepts the message as being a valid message from another CAN/IP 205 host. For a CAN/IP host, the SIR response includes a predetermined string such as "CANIP1". If it does, CAN/IP 205 adds the source address to the ARP cache. If the response does not include the string "CANIP1", all further potential messages from that source are not interpreted as CAN/IP messages.

In one embodiment, once a source address is either accepted or rejected, the status may be maintained until another Address Claimed (PGN=60928) message is received for that source address. At that time, the authentication process is repeated.

In one embodiment, the AP may also verify message data lengths to determine if they are either four or in the range 30 to 578 bytes in length (i.e., an IP datagram plus the two-byte link-layer header).

Figure 4:
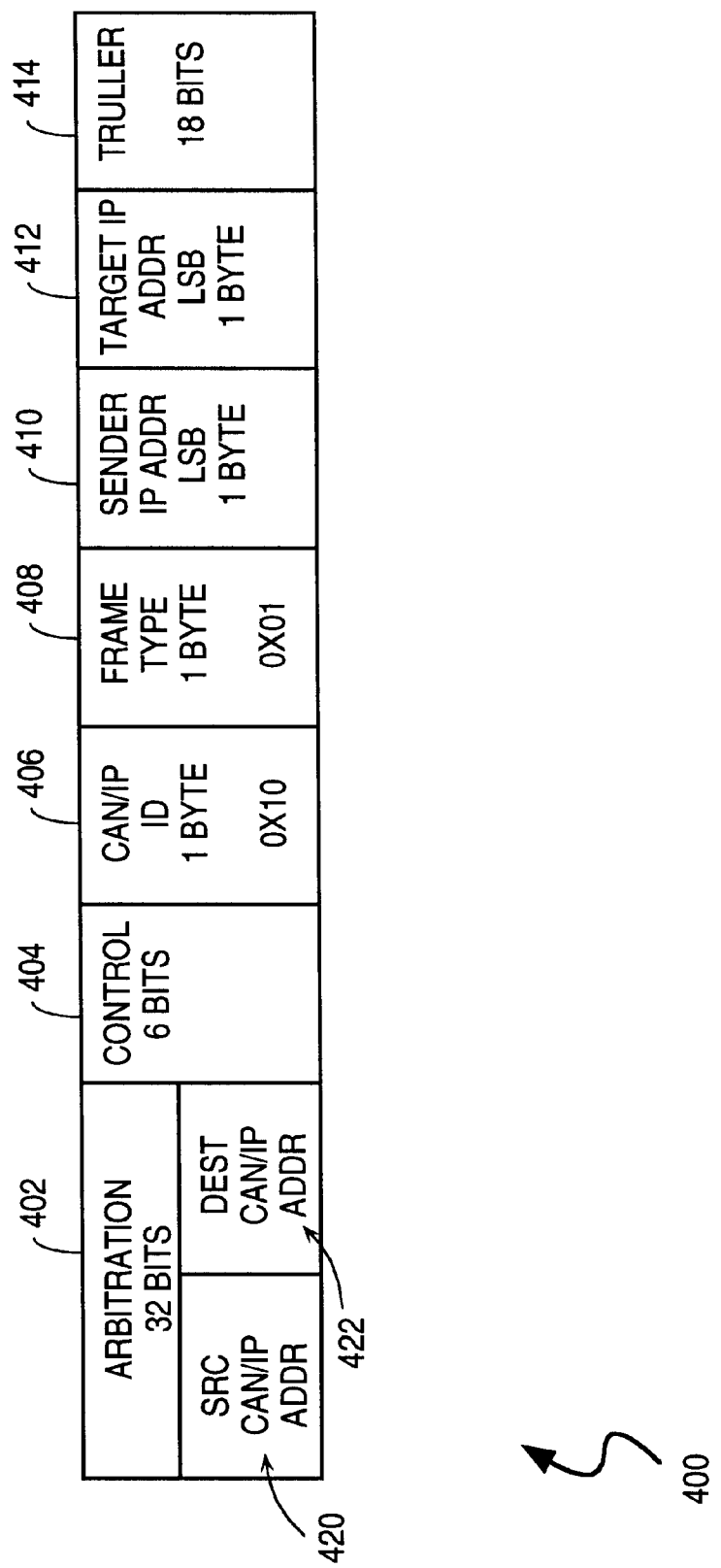
FIG. 4 is a block diagram of one embodiment of an Address Resolution Protocol (ARP) message.

CAN/IP 205 uses an Address Resolution Protocol (ARP) similar to Ethernet ARP for obtaining and resolving addresses on CAN 100. FIG. 3 is a block diagram of an Ethernet Address Resolution Protocol (ARP) message. FIG. 4 is a block diagram of one embodiment of a CAN/IP ARP message.

The Ethernet ARP message 300 is described in Request For Comment (RFC) 826 from the Internet Architecture Board (IAB). Frame Type 314, Hardware Type 316, Protocol Type 318, Hardware Size 320, and Protocol Size 322 have fixed values and are not transmitted in CAN/IP ARP message 400. In one embodiment, Ethernet Destination Address 310 and Target Ethernet Address 330 may be replaced by the Destination CAN Address 422. In this embodiment, the Ethernet Source Address 312 and Sender Ethernet Address 326 may be replaced by the Source CAN Address 420. Destination CAN Address 422 and Source CAN Address 420 are part of Arbitration field 402.

The Ethernet Op 324 is not transmitted in CAN/IP ARP 400. Requests or queries are identified by the Destination CAN Address 422 being set at the broadcast address (usually 255). Replies are identified by the Destination CAN Address 422 not being set at the broadcast address.

In one embodiment, the least significant byte of Sender IP Address 328 is sent as Sender IP Address LSB 410, and the least significant byte of Target IP Address 332 is sent as Target IP Address LSB 412. In this embodiment, the most significant three bytes of all IP addresses on CAN 100 are assumed to be equal for all CAN/IP hosts 104 on a particular instance of CAN 120.

The truncated fields of CAN/IP ARP message 400 have the same values and meanings as the corresponding fields in Ethernet ARP message 300. In one embodiment, CAN/IP ID 406 is set at 16 and Frame Type 408 is set at 1.

In CAN/IP ARP message 400, Arbitration 402, Control 404, and Trailer 414 have standard formats and meanings according to SAEJ1939. In one embodiment, the SAE J1939/21 (222) PGN is 61184.

In one embodiment, after CAN/IP 205 successfully claims its link layer address and determines its CAN/IP address, it transmits a CAN/IP ARP request for its own CAN/IP address.

CAN/IP 205 limits network access using CCP. During periods of congestion on the network, the CAN priority mechanism always gives network access to the highest priority message and no two messages can have equal priority. Thus, because it is desirable for all CAN/IP Hosts 104 to have equivalent access to the CAN 120, the CAN priority mechanism may be circumvented using CCP.

Figure 5:
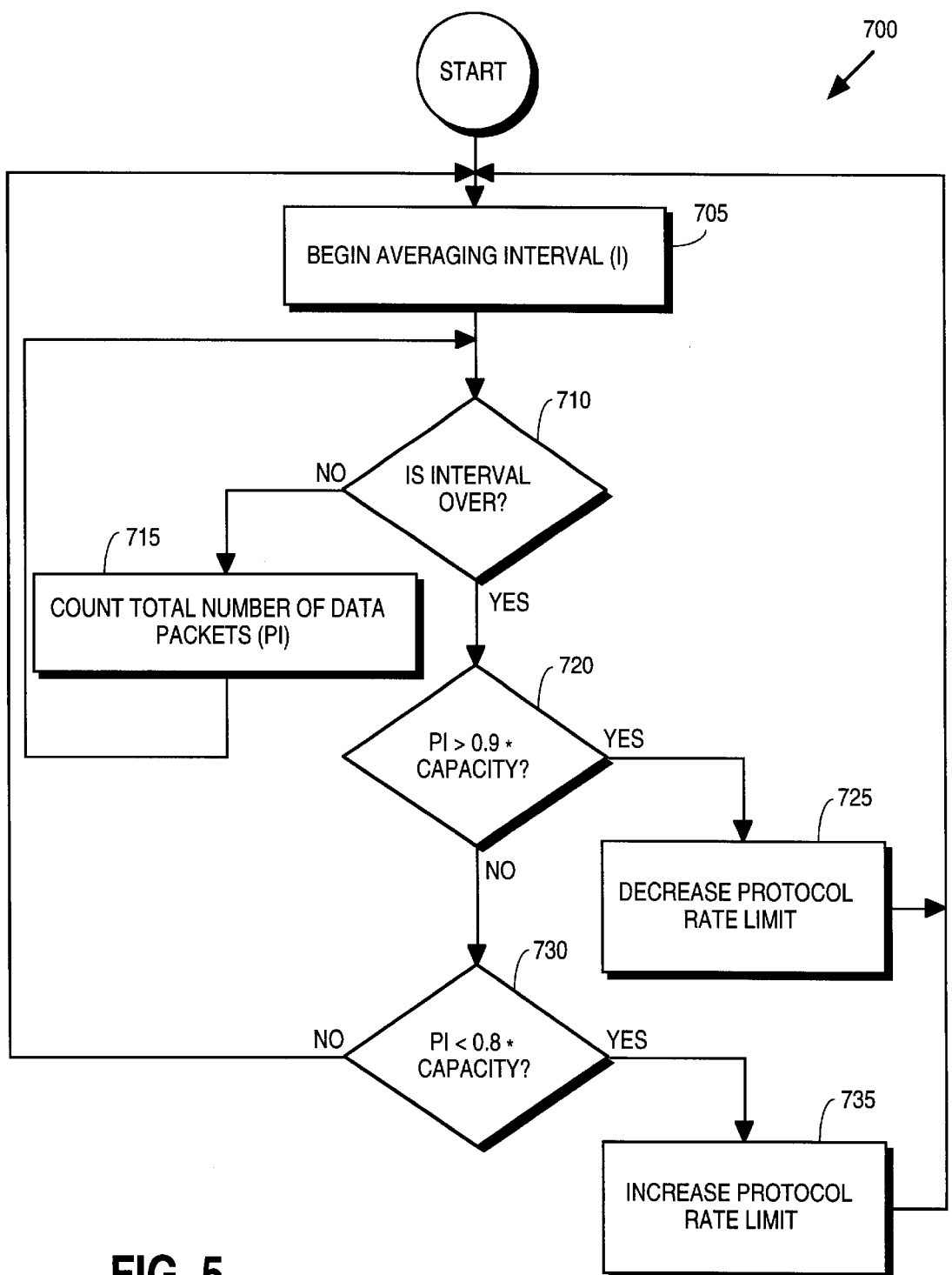
FIG. 5 is a flowchart of one embodiment of a process for resolving CAN/IP message congestion on the CAN.

FIG. 5 is a flowchart of one embodiment for determining the Multi-Packet Transport Protocol Rate Limit (MPTPRL) of Congestion Control Protocol (CCP) of CAN/IP 205. Initially, at step 705, CCP begins maintaining an averaging interval (I). In one embodiment, I may be a 100-millisecond interval. At step 710, CCP determines if the averaging interval started in step 705 is complete. If the averaging interval is complete, CCP continues processing at step 720. However, if CCP determines that the averaging interval is not complete, CCP continues processing at step 715. At step 715, CCP counts the frames (PI) of all types on CAN 120 from all sources.

If, at step 710, CCP determines that I is complete, CCP adjusts the MPTPRL at steps 720 through 735. At step 720, CCP determines if the total number of frames (PI) determined in steps 710 and 715 is greater than 0.9 times the network capacity for packet transmission. If not, CCP continues processing at step 730. If CCP determines that PI is greater than 0.9 times network capacity, CCP continues processing at step 725. In one embodiment, network capacity is assumed to be 200 frames per 100-millisecond interval.

At step 725, CCP decreases MPTPRL. In one embodiment, MPTPRL takes a value from the ordered set comprising a series 80, 40, 27, 20, 16, 13, 11, 10, 9, 8, 7, 6, 5, 4, 3, 2. In this embodiment, CCP decreases MPTPRL by changing its value to the next value to the right of the current value in the ordered set. CCP then returns to step 705 to begin a new averaging interval.

If, at step 720, CCP determines that PI is not greater than 0.9 times network capacity, CCP continues processing at step 730. At step 730, CCP determines if PI is less than 0.8 times network capacity. If not, CCP returns to step 705 to begin a new averaging interval. If, at step 730, PI is less than 0.8 times capacity, CCP continues processing at step 735. At step 735, CCP increases the MPTPRL. In one embodiment, using the same series as in step 725, CCP increases MPTPRL by changing its value to the next value to the left of the current value in the ordered set. CCP then returns to step 705 to begin a new averaging interval.

The value of MPTPRL as determined above is used by CCP to control the number of multi-packet transport protocol frames (PGN=60160 or 60416) that are transmitted by CAN/IP 205. In one embodiment, CCP uses a 100-millisecond interval and assumes the network capacity is 200 frames during this interval. The current MPTPRL is used as a percentage and multiplied by the assumed capacity to determine its limit. If during an interval, CAN/IP 205 transmits its limit of multi-packet transport protocol frames, it will stop transmitting them until the next interval begins. Transmissions of other frame types are not affected by MPTPRL.

Figure 6:
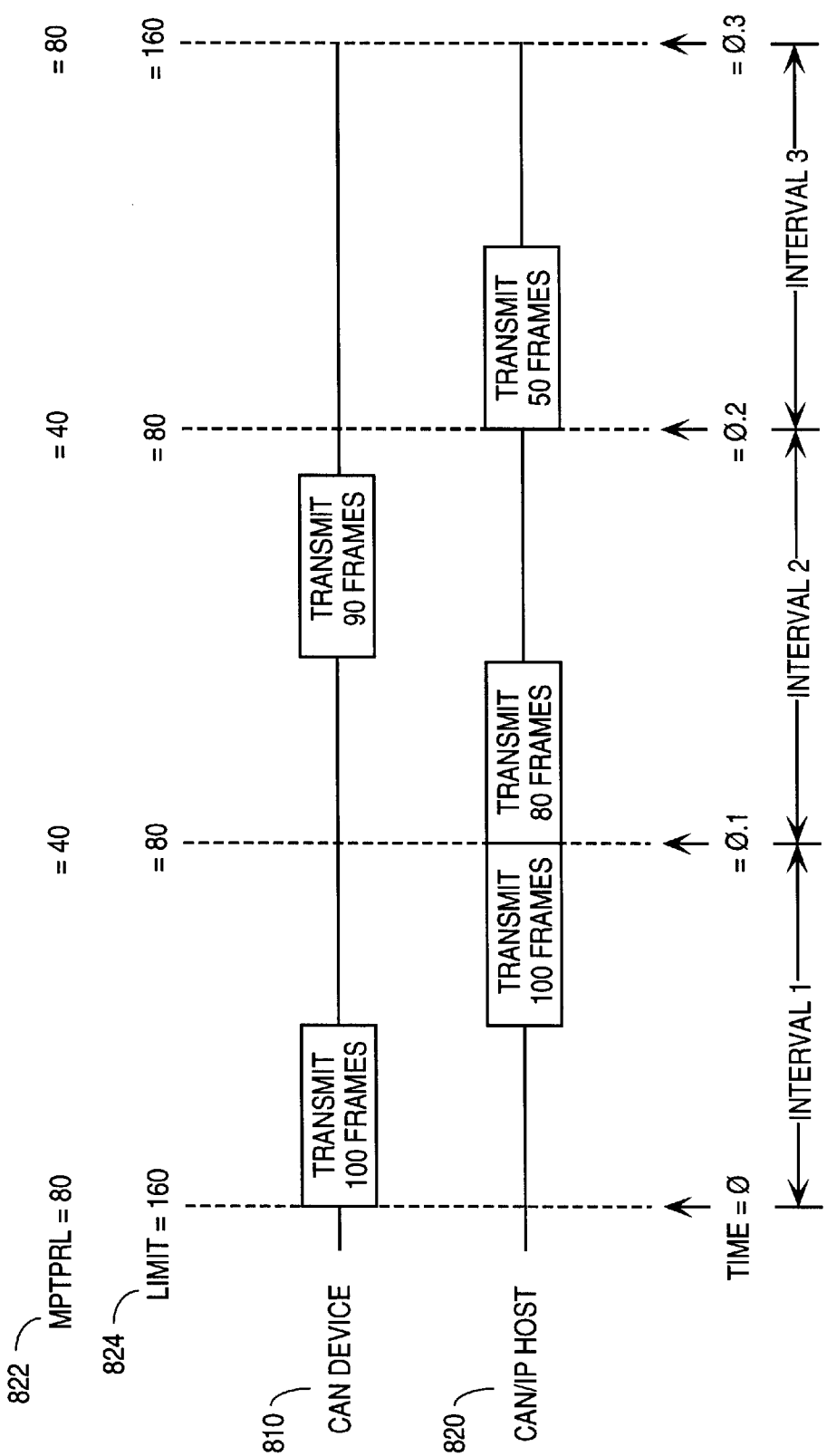
FIG. 6 is an example timeline illustrating one example of CAN/IP congestion control.

FIG. 6 illustrates, by way of example, a time line indicating how CCP limits transmission in CAN/IP Host 820 according to MPTPRL 822. At time=0, MPTPRL 822 has a value 80. Limit 824 is 160 (80% of 200=160). At the beginning of Interval 1, CAN Device 810 transmits 100 frames. At the end of Interval 1, CAN/IP Host 820 transmits 100 frames. In Interval 1, CAN/IP Host 820 does not reach its Limit 824 of 160 frames. At 100 milliseconds, MPTPRL 822 changes to 40 and Limit 824 changes to 80 (40% of 200). At the beginning of Interval 2, CAN/IP Host 820 transmits 80 more multi-packet transport protocol frames and stops because it has reached its limit. CAN Device 810 then transmits 90 more frames. At 200 milliseconds, MPTPRL 822 and Limit 824 remain unchanged. At the beginning of Interval 3, CAN/IP Host 820 completes its transmission by transmitting an additional 50 frames.

Figure 7:
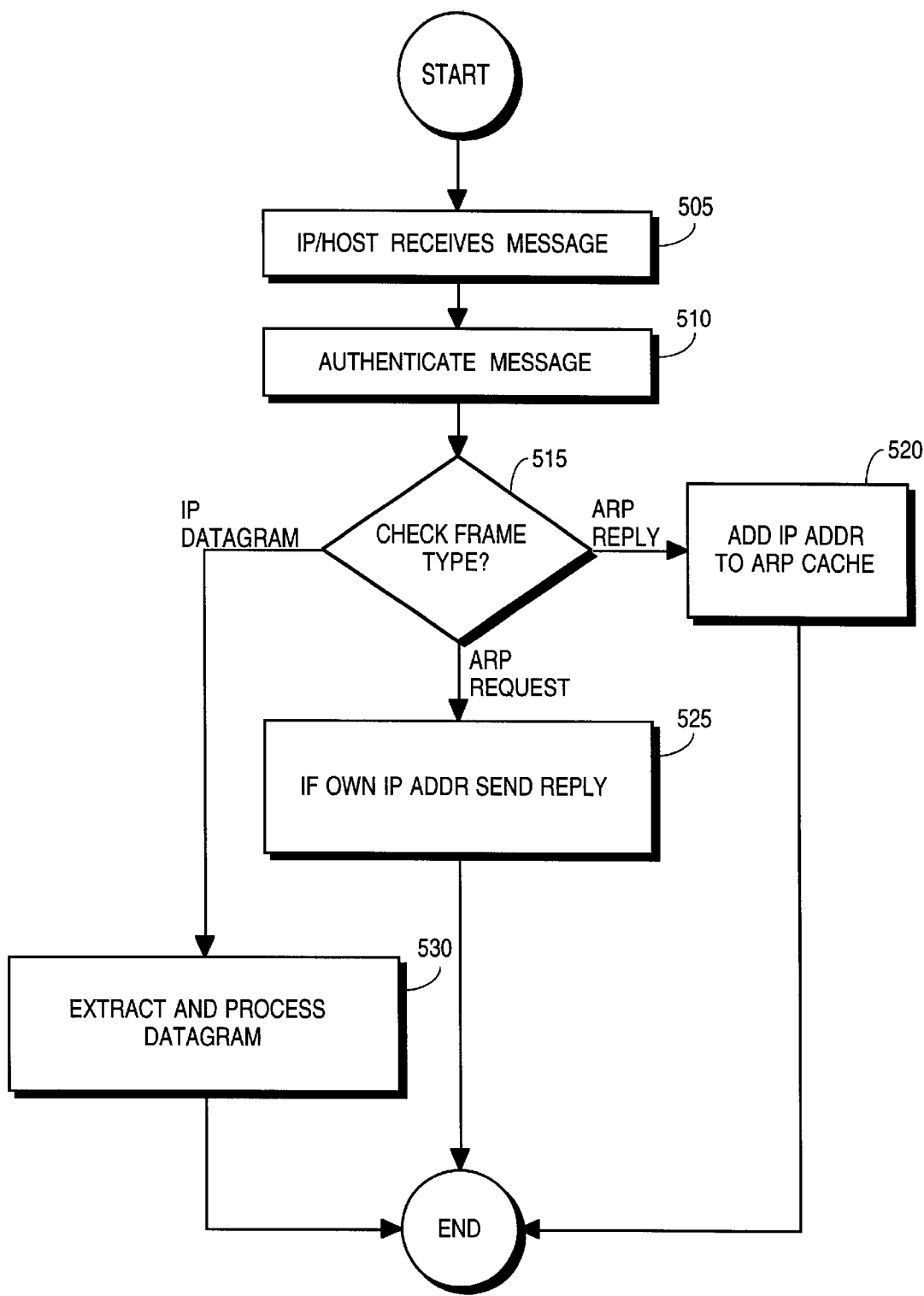
FIG. 7 is a flowchart of one embodiment of a process for receiving CAN/IP protocol messages by the CAN/IP.

FIG. 7 is a flowchart of one embodiment of a method for processing a message received from Controller Area Network (CAN) 120. Initially, at step 505, CAN/IP 205 receives a message to process. In one embodiment, only messages with PGN equal to 61184 and with a first data byte equal to the CAN/IP indicator (a value of 16) are accepted as potential CAN/IP messages. In one embodiment, the length of the message may also be verified to be either 4 or in the range of 30 to 578 bytes, inclusive. In one embodiment, messages that are not accepted as potential CAN/IP messages may be processed according to other protocols, such as SAEJ1939 application messages.

Next, at step 510, CAN/IP 205 authenticates the potential IP message using Authentication Protocol (AP). CAN/IP 205 performs a cache lookup of the CAN source address in the ARP cache 130. The ARP cache 130 contains the CAN addresses of CAN/IP Hosts 104 known to be accessible on CAN 100. If the address is in the ARP cache 130, then CAN/IP 205 continues processing at step 515. However, if the address is not in the cache, CAN/IP 205 transmits a request or query to the sending device to verify that the message is indeed a CAN/IP message.

In one embodiment, CAN/IP 205 uses a standard SAE J1939 message type to request the SIR of the sending device. CAN/IP 205 receives the SIR and, if the SIR response verifies that the message is an IP message (because the sending device is a CAN/IP host), CAN/IP 205 places the address of the sending CAN/IP host in ARP cache 130.

At step 515, CAN/IP 205 checks the frame type of the received message. If the frame type is an ARP reply, CAN/IP 205 enters the Sender IP Address 410 into ARP Cache 130 at step 520. If the frame type is an ARP request, and the requested IP address belongs to CAN/IP Host 104, then an ARP reply is transmitted back to the sender at step 525. If the frame type is an IP datagram, CAN/IP 205 extracts the IP datagram from the CAN/IP message at step 530.

At step 530, CAN/IP 205 sends the IP datagram to the IP layer 212 to process the IP datagram by any conventional processing protocol.

Figure 8:
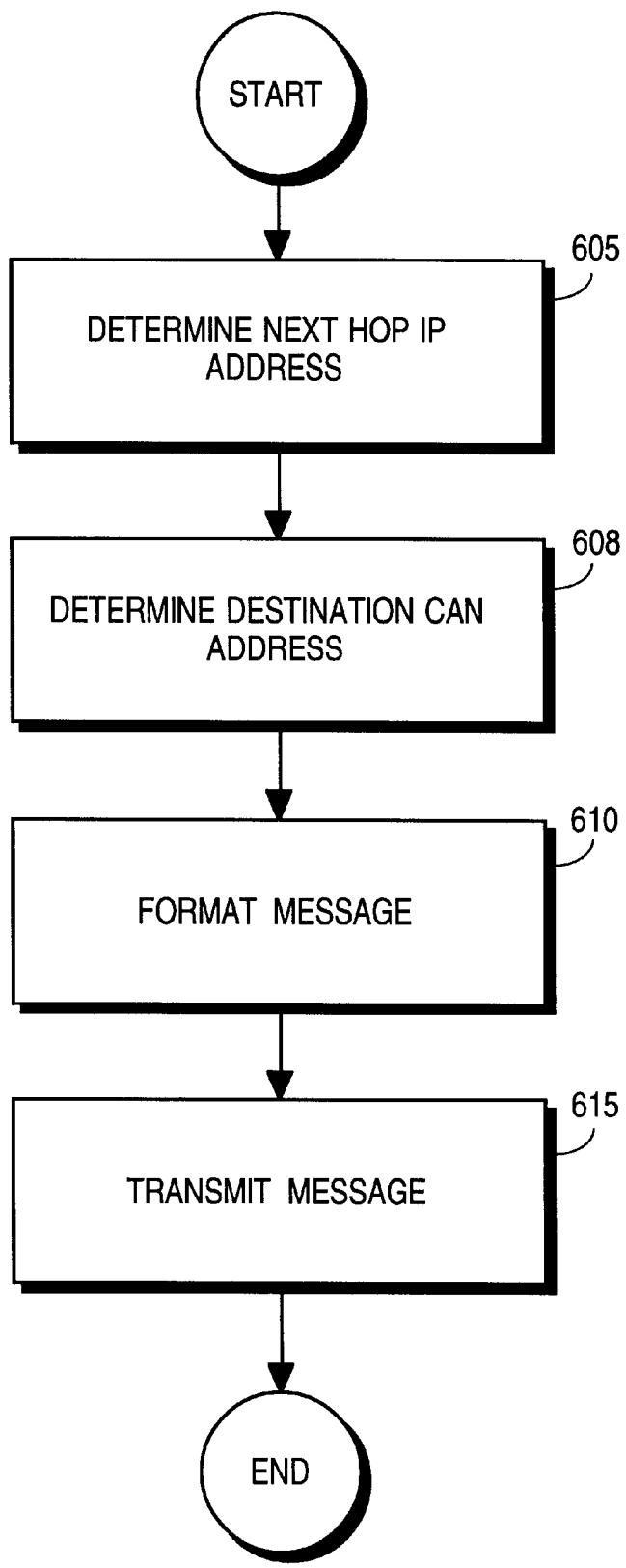
FIG. 8 is a flowchart of one embodiment of a process for creating CAN/IP messages for broadcast over the CAN.

FIG. 8 is a flowchart of one embodiment for transmitting CAN/IP datagrams onto CAN 100. Initially at step 605, IP layer 212 uses the IP datagram's destination address to determine the Next Hop IP address using conventional routing protocols.

At step 608, CAN/IP 205 determines the destination CAN address. If the Next Hop IP address is a broadcast address, CAN/IP 205 uses the CAN global address (255) as the destination CAN address. In one embodiment, if the Next Hop IP address is a multi-cast addresses (a class D address), CAN/IP 205 also uses the CAN global address (255) as the destination address. If the Next Hop IP address is a unicast address, CAN/IP 205 uses ARP to determine the destination CAN address.

At step 610, CAN/IP formats the IP datagram. In one embodiment, a one byte IP identifier and a one byte frame type are appended to the beginning of the data. In one embodiment, the frame type may be set at 0 to indicate an IP datagram.

At step 615, CAN/IP 205 transmits the IP datagram to the Next Hop IP host. CAN/IP 205 uses SAE J1939/21 multi-packet protocol to transmit the IP datagram in packets of seven data bytes at a time. During transmission, CAN/IP 205 limits the number of frames it transmits per time interval using CCP as described above. In one embodiment, IP datagrams are transmitted with their priority bits set at 7 to avoid interfering with standard SAEJ1939 data traffic.

Several variations in the implementation for a system and method to connect Internet Protocol (IP) hosts to a Controller Area Network (CAN) have been described.

The specific arrangements and methods herein are merely illustrative of the principles of this invention. Numerous modifications in form and detail may be made by those skilled in the art without departing from the true spirit and scope of the invention.

Although this invention has been shown in relation to a particular embodiment, it should not be considered so limited. Rather, it is limited only by the appended claims.

What is claimed is:

1. A method of communicating with an Internet protocol (IP) host device on a controller area network (CAN) bus, the method comprising:

determining a CAN bus address of the IP host device on the CAN bus, said device having an IP address in addition to the CAN bus address;

formatting a message conforming to a CAN bus protocol, said message containing an IP datagram and message identifiers;

transmitting the message containing the IP datagram on the CAN bus;

maintaining an averaging interval during transmission of the message by at least one IP host device;

determining a total number of frames of all types present on the CAN bus from all sources during the averaging interval;

adjusting a protocol rate limit at the end of the averaging interval;

receiving the message at the IP host device based upon the CAN bus address;

authenticating the message at the IP host device as an IP message based upon the message identifiers;

extracting and processing the IP datagram from the message by an IP network processing protocol.

2. The method of claim 1 wherein the step of determining further comprises:

formatting a CAN bus address request message;

transmitting the address request message on the CAN bus; and receiving an address reply message, the reply message containing the CAN bus address of the device.

3. The method of claim 2 wherein the address reply message is received from the device.

4. The method of claim 1 wherein adjusting a protocol rate limit further comprises:

if the total number of frames is greater than 0.9 times a network capacity, decreasing the protocol rate limit; and if the total number of frames is less than 0.8 times the network capacity, increasing the protocol rate limit.

5. The method of claim 1 wherein the at least one IP host uses less than protocol rate limit percent of a CAN bus capacity to transmit frames using the protocol rate limit.

6. The method of claim 1 wherein the CAN bus capacity is 2000 frames per second.

7. The method of claim 1 wherein the step of authenticating further comprises:

looking-up the CAN bus address for the device in a cache; and if the CAN bus address for the device is not found in the cache, formatting a CAN bus query message, transmitting the query message on the CAN bus, receiving a query reply message comprising the CAN bus address for the device, and adding the CAN bus address for the device to the cache.

8. A method comprising:

transmitting a CAN protocol message containing an IP datagram and message identifiers on a CAN bus to an IP host device;

maintaining an averaging interval during transmission of the message by at least one IP host device on the CAN bus;

determining a total number of frames of all types present on the CAN bus from all sources during the averaging interval;

adjusting a protocol rate limit at the end of the averaging interval;

receiving the CAN protocol message at the IP host device based upon a CAN bus address, the message including the IP datagram and the message identifiers;

authenticating the CAN protocol message as containing an IP message based upon the message identifiers; and extracting the IP datagram from the CAN protocol message and processing the IP datagram by a conventional IP network processing protocol.

9. The method of claim 8 wherein the step of authenticating further comprises:

looking-up the CAN bus address for the IP host device in a cache; and if the CAN bus address for the IP host device is not found in the cache, formatting a CAN bus query message, transmitting the query message on the CAN bus, receiving a query reply message, and adding the CAN bus address for the IP host device to the cache.

10. A method comprising:

providing a set of IP hosts on a CAN bus, each of said set of IP hosts having an IP address and a CAN bus address;

receiving an IP data message from an application within one of the set of IP hosts;

formatting a transmittal message conforming to a CAN bus protocol, said transmittal message containing an IP datagram and message identifiers; and transmitting the IP data message on the CAN bus to a second of one of the set of IP hosts based upon a CAN bus address of the second of one of the set of IP hosts;

maintaining an averaging interval during transmission of the message by at least one IP host device;

determining a total number of frames of all types present on the CAN bus from all sources during the averaging interval; and adjusting a protocol rate limit at the end of the averaging interval.

11. A computer-readable medium comprising program instructions, the program instructions being executable by a computer to perform a method, the method comprising:

determining a bus address of an IP host device on a CAN bus, said device having an IP address and a CAN bus address;

formatting a message conforming to a CAN bus protocol, said message containing an IP datagram and message identifiers; and transmitting the message containing the IP datagram on the CAN bus;

maintaining an averaging interval by at least one IP host;

determining a total number of frames of all types present on the CAN bus from all sources during the averaging interval; and adjusting a protocol rate limit at the end of the averaging interval.

12. The medium of claim 11 wherein the method of determining further comprises:

formatting a CAN bus address request message;

transmitting the address request message on the CAN bus; and receiving an address reply message, the reply message containing the CAN bus address of the device.

13. A computer-readable medium comprising program instructions, the program instructions being executable by a computer to perform a method, the method comprising:

transmitting a CAN protocol message containing an IP datagram and message identifiers on a CAN bus to an IP host device;

maintaining an averaging interval during transmission of the message by at least one IP host device on the CAN bus;

determining a total number of frames of all types present on the CAN bus from all sources during the averaging interval;

adjusting a protocol rate limit at the end of the averaging interval;

receiving the message at the IP host device based upon the CAN bus address, the message including the IP datagram and the message identifiers;

authenticating the message as an IP message based upon the message identifiers; and extracting the IP datagram from the message and processing the IP datagram by a conventional IP network processing protocol.

14. The medium of claim 13 wherein, the method of authenticating further comprises:
looking-up the CAN bus address for a device in a cache; and
if the CAN bus address for the device is not found in the cache,
formatting a CAN bus query message,
transmitting the query message on a CAN bus,
receiving a query reply message, and
adding the CAN bus address for the device to the cache.

15. A system comprising:
means for determining a CAN bus address of an IP host device on a CAN bus, the IP host device having an IP address in addition to the CAN bus address;
means for formatting a message conforming to a CAN bus protocol, the message containing an IP datagram and a message identifier;
means for transmitting the message containing the IP datagram on the CAN bus;
means for maintaining an averaging interval during transmission of the message by at least one IP host device;
means for determining a total number of frames of all types present on the CAN bus from all sources during the averaging interval;
means for adjusting a protocol rate limit at the end of the averaging interval;
means for receiving a CAN protocol message based upon a CAN bus address, said message including the IP datagram and message identifiers;
means for authenticating the CAN protocol message as an IP message based upon the message identifiers; and
means for extracting the IP datagram from the CAN protocol message and processing the IP datagram by a conventional IP network processing protocol.

16. A system comprising:
a message formatted according to a CAN bus protocol, said message containing IP data and message identifiers;
at least one source IP host connected to a CAN bus, said at least one source IP host places the message on the CAN bus, wherein the at least one source IP host further maintains an averaging interval, determines a total number of frames of all types present on the CAN bus from all sources during the averaging interval, and adjusts a protocol rate limit at the end of the averaging interval; and
at least one destination IP host connected to the CAN bus, said at least one destination IP host having an IP address and a CAN bus address, said at least one destination IP host receives the message based upon the CAN bus address, authenticates the message as an IP message based upon the message identifiers, and extracts the IP data from the message.

17. The system of claim 16 wherein the at least one source IP host further formats a CAN bus address request message; transmits the address request message on the CAN bus; and receives an address reply message, the reply message containing the CAN bus address of the at least one destination IP host.

18. A method comprising:
receiving a request that a datagram be sent to an IP address corresponding to a control-based IP host on a CAN bus, the IP address contained within the request;
requesting a CAN bus address for the control-based IP host corresponding to the IP address;
receiving a reply message from the control-based IP host containing the CAN bus address;
transmitting an IP data packet contained within a CAN data packet to the control-based IP host over the CAN bus;
maintaining an averaging interval during transmission of the message by at least one control based IP host device;
determining a total number of frames of all types present on the CAN bus from all sources during the averaging interval; and
adjusting a protocol rate limit at the end of the averaging interval.

19. A method, the method comprising:
transmitting a CAN protocol message containing an IP datagram and message identifiers on a CAN bus to an IP host device;
maintaining an averaging interval during transmission of the message by at least one IP host device on the CAN bus;
determining a total number of frames of all types present on the CAN bus from all sources during the averaging interval; and
adjusting a protocol rate limit at the end of the averaging interval.

* * * * *